US011193383B2

(12) United States Patent
Goulds

(10) Patent No.: US 11,193,383 B2
(45) Date of Patent: Dec. 7, 2021

(54) TAIL BEARING HOUSING

(71) Applicant: ROLLS-ROYCE plc, London (GB)

(72) Inventor: Robert Goulds, Derby (GB)

(73) Assignee: ROLLS-ROYCE plc, London (GB)

(*) Notice: Subject to any disclaimer, the term of this patent is extended or adjusted under 35 U.S.C. 154(b) by 197 days.

(21) Appl. No.: 16/256,303

(22) Filed: Jan. 24, 2019

(65) Prior Publication Data

US 2019/0242264 A1 Aug. 8, 2019

(30) Foreign Application Priority Data

Feb. 7, 2018 (GB) ...................................... 1801956

(51) Int. Cl.
*F01D 9/06* (2006.01)
*F01D 25/16* (2006.01)
*F01D 25/30* (2006.01)
*F01D 9/04* (2006.01)
(Continued)

(52) U.S. Cl.
CPC ............... *F01D 9/06* (2013.01); *F01D 9/041* (2013.01); *F01D 9/065* (2013.01); *F01D 25/162* (2013.01); *F01D 25/30* (2013.01); *F02C 9/18* (2013.01); *F02K 3/06* (2013.01);
(Continued)

(58) Field of Classification Search
CPC . F01D 9/06; F01D 9/041; F01D 9/065; F01D 25/162; F01D 25/30; F02C 9/18; F02K 3/06; F05D 2220/323; F05D 2240/12; F05D 2260/606
See application file for complete search history.

(56) References Cited

U.S. PATENT DOCUMENTS 5,044,152 A * 9/1991 Hoizumi ............... F01K 23/101
60/773
5,154,048 A * 10/1992 Ponziani ................... F01D 5/08
60/792

(Continued)

FOREIGN PATENT DOCUMENTS

EP 1 574 668 A2 9/2005
EP 2 022 938 A2 2/2009

OTHER PUBLICATIONS

Jun. 26, 2019 extended European Search Report issued in European Patent Application No. 19153324.9.
(Continued)

*Primary Examiner* — Courtney D Heinle
*Assistant Examiner* — Andrew Thanh Bui
(74) *Attorney, Agent, or Firm* — Oliff PLC

(57) ABSTRACT

A tail bearing housing of a turbomachine comprises an inner casing and an outer casing concentrically arranged along a longitudinal axis, and a plurality of vanes having a leading edge, a trailing edge, a first wall extending from the leading edge to the trailing edge and a second wall extending from the leading edge to the trailing edge, the first wall and the second wall defining an aerofoil, the vanes being connected at a first end to the outer casing and at a second end to the inner casing. At least one vane of the plurality of vanes is a vent vane comprising a first aperture arranged in the first end and a second aperture arranged in the aerofoil, the second aperture being configured to be in fluid communication with the first aperture through an inner cavity to vent bleed air.

19 Claims, 15 Drawing Sheets

(51) Int. Cl.
*F02C 9/18* (2006.01)
*F02K 3/06* (2006.01)

(52) U.S. Cl.
CPC .... *F05D 2220/323* (2013.01); *F05D 2240/12* (2013.01); *F05D 2260/606* (2013.01)

(56) References Cited

U.S. PATENT DOCUMENTS

| | | | | |
|---|---|---|---|---|
| 5,167,484 | A * | 12/1992 | Ponziani | F01D 5/08 415/1 |
| 6,997,676 | B2 * | 2/2006 | Koshoffer | F01D 5/148 415/115 |
| 8,029,234 | B2 * | 10/2011 | McCaffrey | F01D 9/065 415/142 |
| 10,578,114 | B2 * | 3/2020 | Regnard | F01D 25/30 |
| 2012/0186261 | A1 | 7/2012 | Toprani et al. | |
| 2015/0121842 | A1 * | 5/2015 | Moes | F02K 3/075 60/204 |
| 2015/0330249 | A1 | 11/2015 | Budnick | |
| 2015/0337682 | A1 | 11/2015 | Yeager et al. | |

OTHER PUBLICATIONS

Jul. 26, 2018 Search Report issued in Britain Application No. GB180195.2.

* cited by examiner

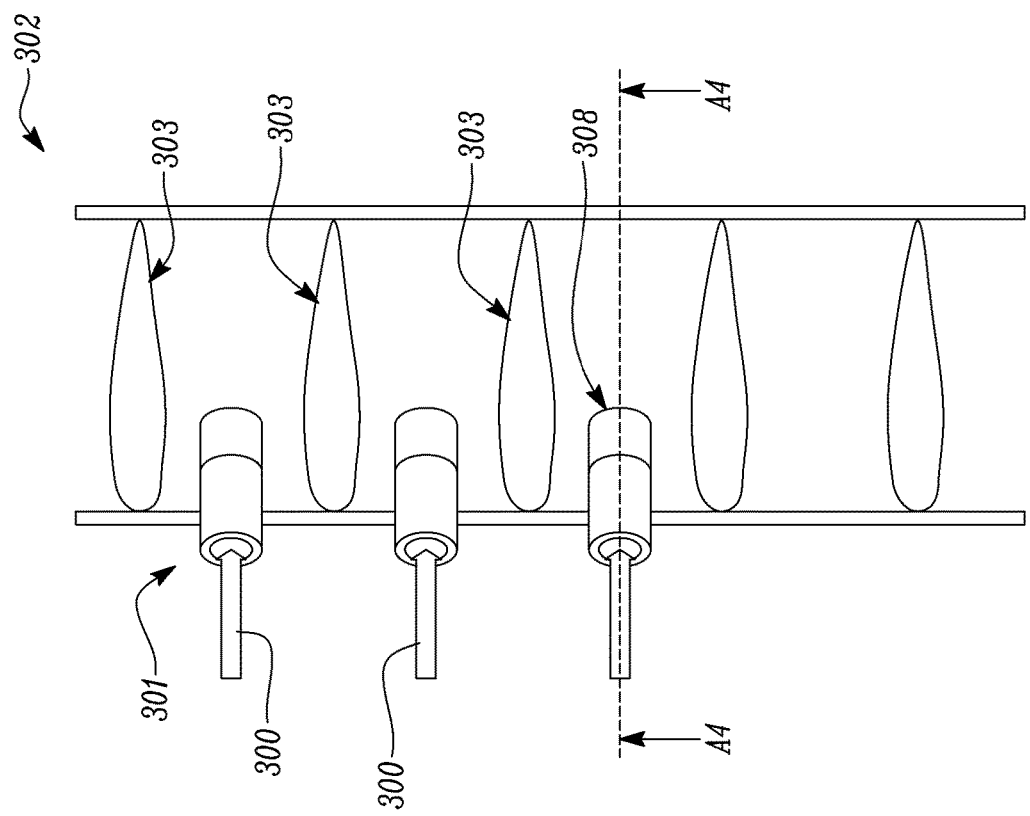

TAIL BEARING HOUSING

CROSS-REFERENCE TO RELATED APPLICATIONS

This specification is based upon and claims the benefit of priority from UK Patent Application Number 1801956.2 filed on 7 Feb. 2018, the entire contents of which are incorporated herein by reference.

BACKGROUND

Field of the Disclosure

The present disclosure relates to a tail bearing housing, and in particular to a tail bearing housing for bleeding air in gas turbine engines.

Description of the Related Art

A gas turbine engine generally comprises, in axial flow series, an air intake, a fan, one or more compressors, a combustor, one or more turbines, and an exhaust nozzle. Air entering the air intake is accelerated by the fan to produce two air flows: a first air flow (core engine flow) into compressor and a second air flow (bypass flow) which passes through a bypass duct to provide propulsive thrust. Air entering the compressor is compressed, mixed with fuel and then fed into the combustor, where combustion of the air/fuel mixture occurs. The high temperature and high energy exhaust fluids are then fed to the turbine, where the energy of the fluids is converted to mechanical energy to drive the compressor in rotation by suitable interconnecting shaft. Downstream of the turbine, the core engine flow passes through a tail bearing housing provided with vanes.

FIGS. 2 and 2a show an example of a conventional bleed system in a gas turbine engine 199. Bleed air 200 from a gas turbine engine compressor 201 is conventionally extracted using handling bleed valves 202 provided in a casing 198 and vented into the engine bypass duct 203 to increase the surge margin of the compressor 201 at various conditions throughout the engine cycle. As the bleed air 200 has high kinetic energy and high temperature, problems can arise where the high energy and high temperature bleed air 200 impinges directly onto the bypass duct walls 204 which can quickly cause damage to the composite material construction. Indeed, the bleed air 200 can carry sufficient kinetic energy to cross the bypass flow air 210, which is a low energy flow air. In the scenario where the handling bleed valve 202 fails open, damage to the bypass duct walls 204 can occur. Attenuators and seals can be provided, but are costly to manufacture. An exemplary attenuator 205 is shown in detail in FIG. 2a. The attenuator 205 comprises a perforated plate, or a grid, 206 secured to an inner wall 207 of the bypass duct 203 by means of a seal 208. The attenuator 205 is connected to the handling bleed valve 202 by means of an outlet duct 209. The perforated plate 206 reduces to some extent the kinetic energy of the bleed air 200.

FIGS. 3-5 show an alternative example of bleed system. Bleed air 300 extracted from the compressor (not shown) through the handling bleed valves (not shown) is passed through a duct system 301 to the tail bearing housing 302 where the bleed air 300 is bled into the core engine flow 307 between adjacent vanes 303 connected to an inner casing 304 and an outer casing 305 of the tail bearing housing 302. As the bleed air 300 is bled transversaly to the core engine flow 307, shearing of the relative air flows can generate noise and, when the bleed air 300 is not flowing, there is potential for the core engine flow 307 flowing over open ends 308 of the ducts to cause acoustic tones (organ piping).

Accordingly it is desirable to overcome the above mentioned problems.

SUMMARY

According to a first aspect, there is provided a tail bearing housing of a turbomachine comprising an inner casing and an outer casing concentrically arranged along a longitudinal axis, and a plurality of vanes having a leading edge, a trailing edge, a first wall extending from the leading edge to the trailing edge, and a second wall extending from the leading edge to the trailing edge, the first wall and the second wall defining an aerofoil, the vanes being connected at a first end to the outer casing and at a second end to the inner casing. At least one vane of said plurality of vanes is a vent vane comprising a first aperture arranged in the first end and a second aperture arranged in the aerofoil, the second aperture being configured to be in fluid communication with the first aperture through an inner cavity to vent bleed air.

In the present application, front and rear is with respect to the vanes, i.e. the leading edge being in the front and the trailing edge being in the rear of the vane. Moreover, in the present application, a chordwise direction is a direction extending between the leading edge and the trailing edge of the vane; a spanwise direction is a direction extending between the first end of the vane and the second end of the vane; and a thickness direction is a direction extending between the first wall of the vane and the second wall of the vane.

The plurality of vanes may be outlet guide vanes.

The second aperture may be arranged at the trailing edge. Alternatively, the second aperture may be arranged adjacent to the trailing edge.

The second aperture may be a slot. The second aperture may extend along the spanwise direction. The second aperture may extend along the thickness direction.

The second aperture may be a circular hole.

A core engine flow may flow through the tail bearing housing between the vanes, for example to remove residual swirl, and the second aperture may be shaped such that bleed air is vented parallel to the core engine flow.

The second aperture may be shaped such that bleed air is vented parallel to the longitudinal axis. The second aperture may extend longitudinally parallel to the longitudinal axis. Alternatively, the second aperture may extend longitudinally angled to the longitudinal axis. Alternatively, the second aperture may extend longitudinally along a curved axis.

The vane may comprise a plurality of second apertures. The plurality of second apertures may all be in fluid communication with the first aperture.

The second apertures may be arranged along the trailing edge.

The second apertures may be arranged mutually aligned and/or offset from the trailing edge.

The second apertures may be arranged in groups of at least two second apertures, each group being arranged at different spanwise heights along the vent vane. Each group may comprise one second aperture arranged at the trailing edge and one or more additional second apertures arranged adjacent the trailing edge. The second apertures of each group may be slots arranged mutually parallel. One of the slots may be arranged parallel to the trailing edge.

The second apertures of each group may be arranged aligned along a direction perpendicular to the longitudinal axis.

The vent vane may comprise a septum extending from the first wall to the second wall transversally to the longitudinal axis and dividing the inner cavity into a first chamber and a second chamber, the first chamber being closer to the trailing edge than the second chamber, the first aperture being in fluid communication with the second aperture through the first chamber. The septum may extend along the thickness direction.

The outer casing may comprise a conduit arranged in correspondence of the first aperture of the vent vane. The conduit may be configured to connect to a duct system. The conduit may be provided with a flange.

The tail bearing housing may comprise a plurality of vent vanes.

The vent vanes may extend radially along the longitudinal axis. Alternatively, the vanes may extend angled to a respective radial direction.

According to a second aspect, there is provided a gas turbine engine, comprising:
 a compressor comprising a handling bleed valve,
 a tail bearing housing according to the first aspect, and
 a duct system connecting the handling bleed valve with a vane of the tail bearing housing to extract from the compressor, and vent through the second apertures, bleed air.

In this light, the tail bearing housing may comprise a plurality of vent vanes and the duct system may comprise a manifold configured to connect the handling bleed valve to the plurality of vent vanes.

The compressor may comprise a plurality of handling bleed valves and the duct system may comprise a plurality of manifolds, each manifold being configured to connect one handling bleed valve to a plurality of vanes.

Alternatively, the manifolds may be dispensed with and the duct system may comprise a plurality of ducts, each duct connecting one handling bleed valve to one vent vane.

The bleed air may be vented into the core engine flow, where some thrust recovery may occur.

In general, the bleed air may be vented parallel to the core engine flow, so shear between the bleed air and the core engine flow may be minimised, thereby minimising noise.

As the core engine flow downstream of the vanes is substantially parallel to the longitudinal axis, the bleed air may be vented parallel to the longitudinal axis.

The outer casing of the tail bearing housing may comprise a conduit arranged in correspondence of the first aperture of the vent vane and the duct system may be secured to the conduit by means of a flanged coupling.

According to a third aspect, there in provided a method for venting bleed air in a gas turbine engine. The method comprises providing a gas turbine engine comprising a compressor provided with a handling bleed valve, and a tail bearing housing provided with an inner casing, an outer casing and a plurality of vanes connected at a first end to the outer casing and at a second end to the inner casing. The vanes have a leading edge, a trailing edge, a first wall extending from the leading edge to the trailing edge, and a second wall extending from the leading edge to the trailing edge, the first wall and the second wall defining an aerofoil. At least one vane of the plurality of vanes is a vent vane comprising a first aperture arranged in the first end and a second aperture arranged in the aerofoil, the second aperture being configured to be in fluid communication with the first aperture through an inner cavity to vent bleed air. The method further comprises extracting bleed air from the compressor through the handling bleed valve, directing the bleed air to the at least one vent vane through a duct system connecting the handling bleed valve with the first aperture, and venting the bleed air from said at least one vent vane through the second aperture.

The inner casing and the outer casing may be provided concentrically arranged along a longitudinal axis, and venting the bleed air from the at least one vent vane through the second aperture may include venting the bleed air parallel to a core engine flow at the trailing edge of the vent vane.

The method may comprise venting the bleed air parallel to the longitudinal axis.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein

BRIEF DESCRIPTION OF THE DRAWINGS

Embodiments will now be described by way of example only, with reference to the Figures, in which:

FIG. 3 is a rolled out view of a portion of a conventional tail bearing housing and duct system connecting a handling bleed system (not shown);

DETAILED DESCRIPTION OF THE DISCLOSURE

Figure 1:
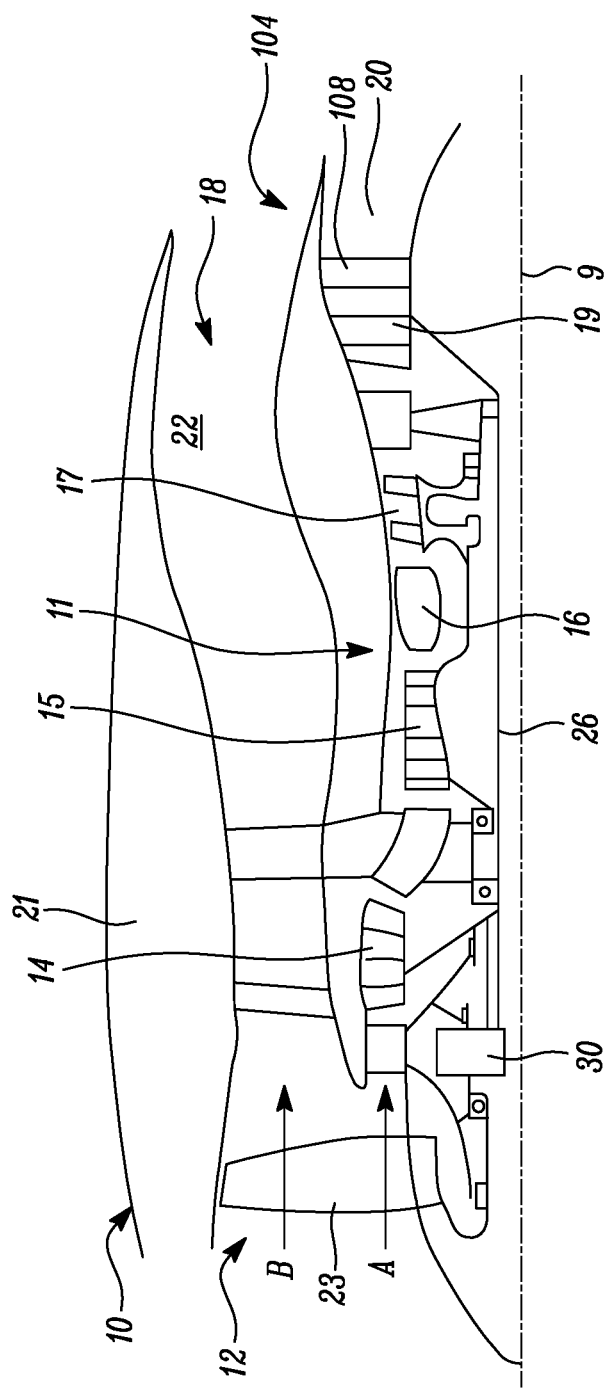
FIG. 1 is a sectional side view of a gas turbine engine incorporating a tail bearing housing according to an embodiment.
Figures 2, 2A:
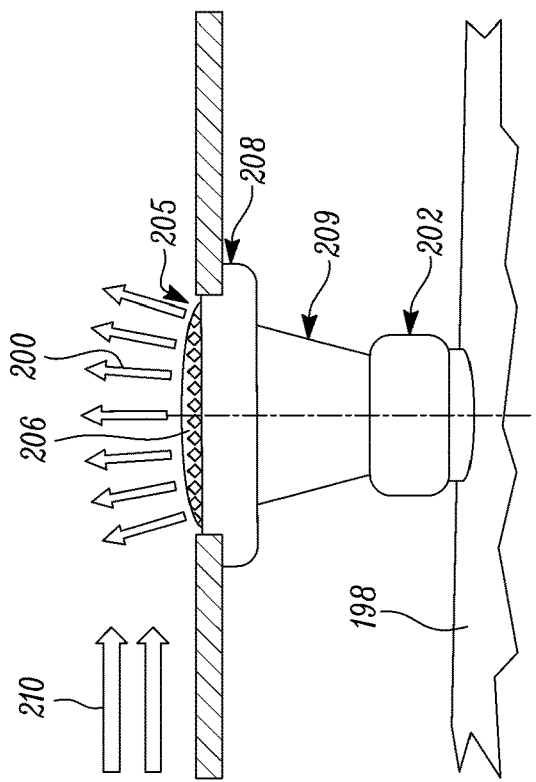
FIG. 2 is a side view of a gas turbine engine with conventional compressor handling bleed installations with attenuators.
FIG. 2a is a detail of an attenuator of FIG. 2.
Figure 4:
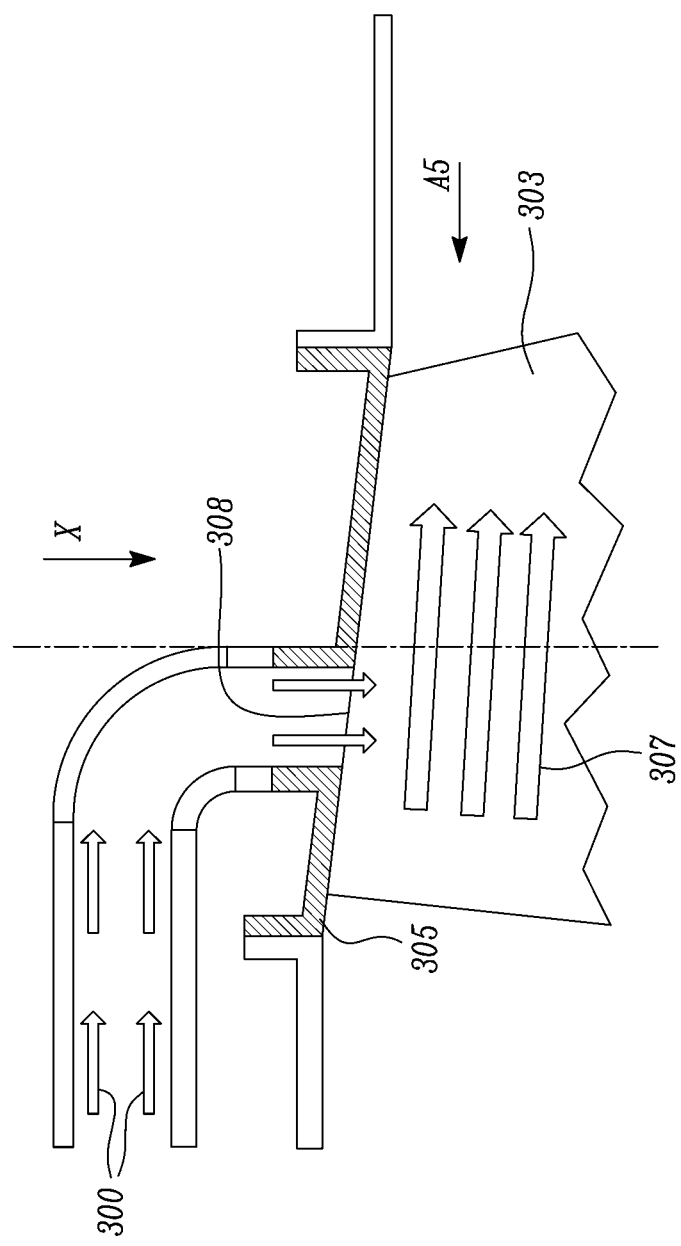
FIG. 4 is a sectional side view of the tail bearing housing of FIG. 3 along line A4-A4 of FIG. 3.
Figure 5:
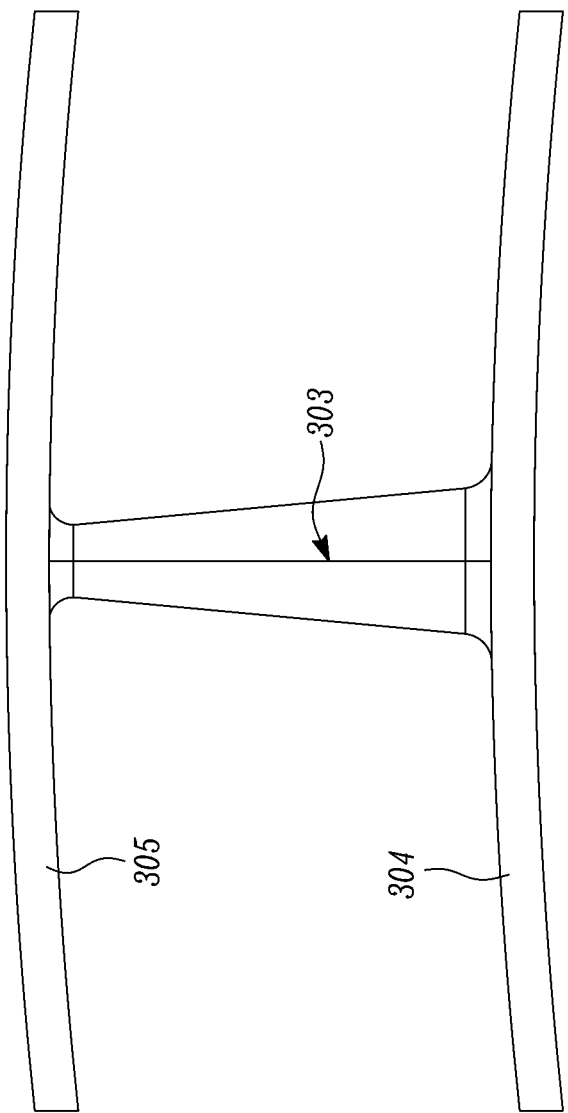
FIG. 5 a rear view of the vent vane of FIG. 4 along arrow A5 of FIG. 4
Figure 5:
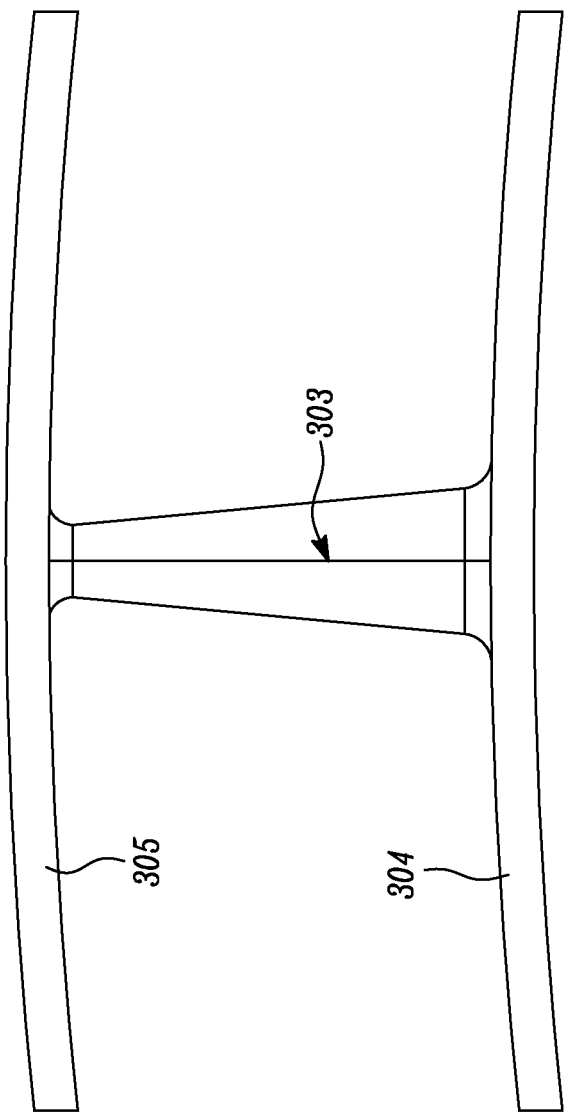

FIG. 1 illustrates a gas turbine engine 10 having a principal rotational axis 9. The engine 10 comprises an air intake 12 and a propulsive fan 23 that generates two airflows A and B. The gas turbine engine 10 comprises a core engine 11 having, in axial flow A, an intermediate pressure compressor 14, a high-pressure compressor 15, combustion equipment 16, a high-pressure turbine 17, an intermediate pressure turbine 19 and a core exhaust nozzle 20. Downstream of the turbine, the gas turbine engine 10 is provided with a tail bearing housing 104 comprising vanes 108, which will be described in detail with reference to FIGS. 6-14.

A nacelle 21 surrounds the gas turbine engine 10 and defines, in axial flow B, a bypass duct 22 and a bypass exhaust nozzle 18. The fan 23 is coupled to and driven by the intermediate pressure turbine 19 via shaft 26 and power gearbox 30. In detail, the fan 23 is connected to the intermediate pressure compressor 14 through the power gearbox 30 and the shaft 26 connects the intermediate pressure turbine 19 and the intermediate pressure compressor 14. The power gearbox 30 may be an epicyclic gearbox of the planetary type, or a differential gearbox.

The gas turbine engine 10 works in a conventional manner with air in the core airflow A being accelerated and compressed by the intermediate pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive the high pressure and intermediate pressure turbines 17, 19 before being exhausted through the nozzle 20 to provide some propulsive thrust. The high pressure turbine 17 drives the high pressure compressor 15 by a suitable interconnecting shaft. The fan 23 generally provides the majority of the propulsive thrust. The power gearbox 30 is a reduction gearbox, i.e. the propulsive fan 23 rotates at a slower speed than the intermediate pressure compressor 14.

Additionally or alternatively the power gearbox may drive additional and/or alternative components (e.g. the high pressure compressor and/or a booster compressor, propeller (aero or hydro), or electrical generator). Additionally or alternatively such engines may have an alternative number of compressors and/or turbines and/or an alternative number of interconnecting shafts.

Aspects of the disclosure will be described with particular reference to FIGS. 6-14.

Figure 6:
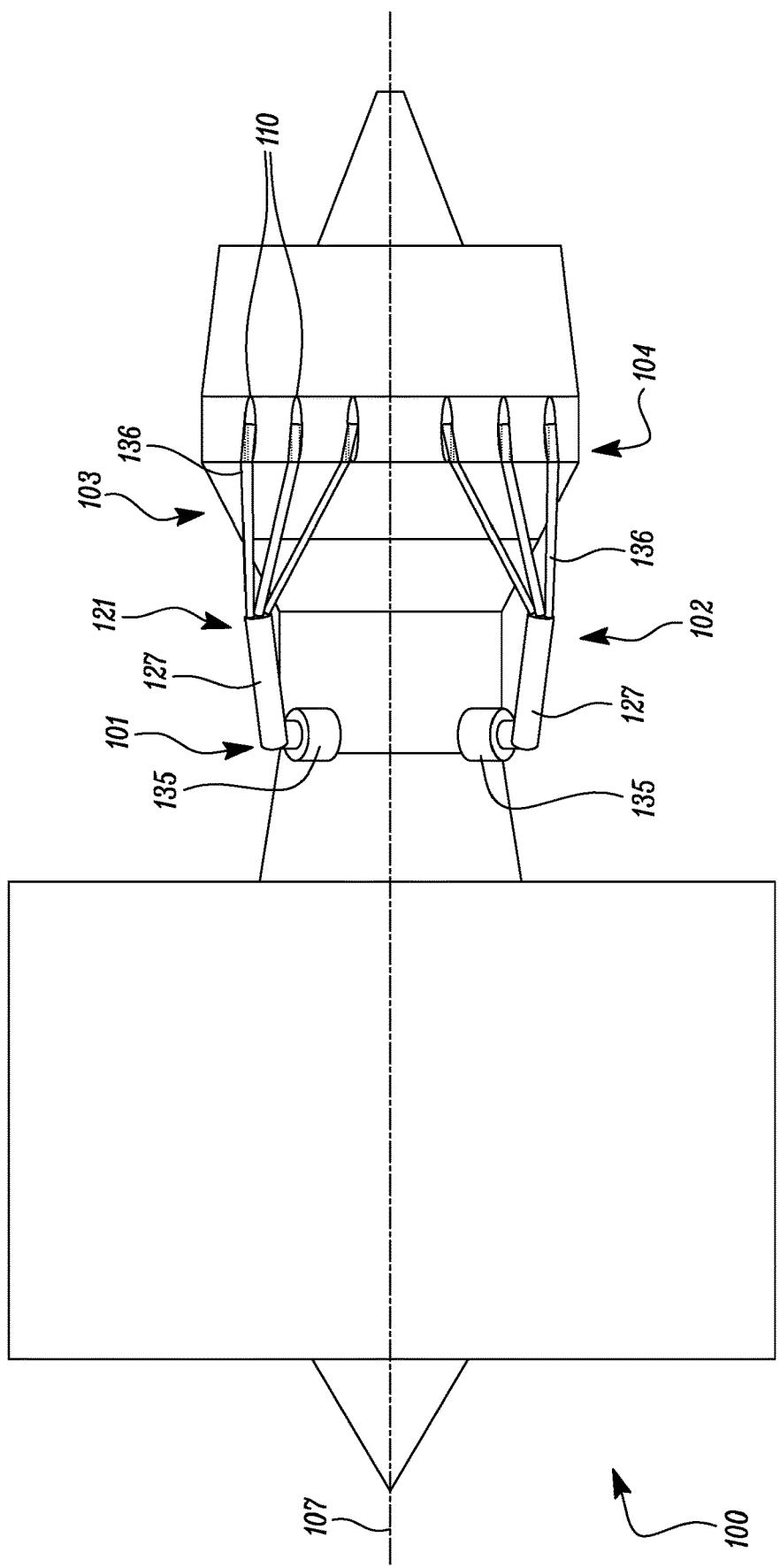
FIG. 6 is a side view of a gas turbine engine including a tail bearing housing according to an embodiment.
Figure 7:
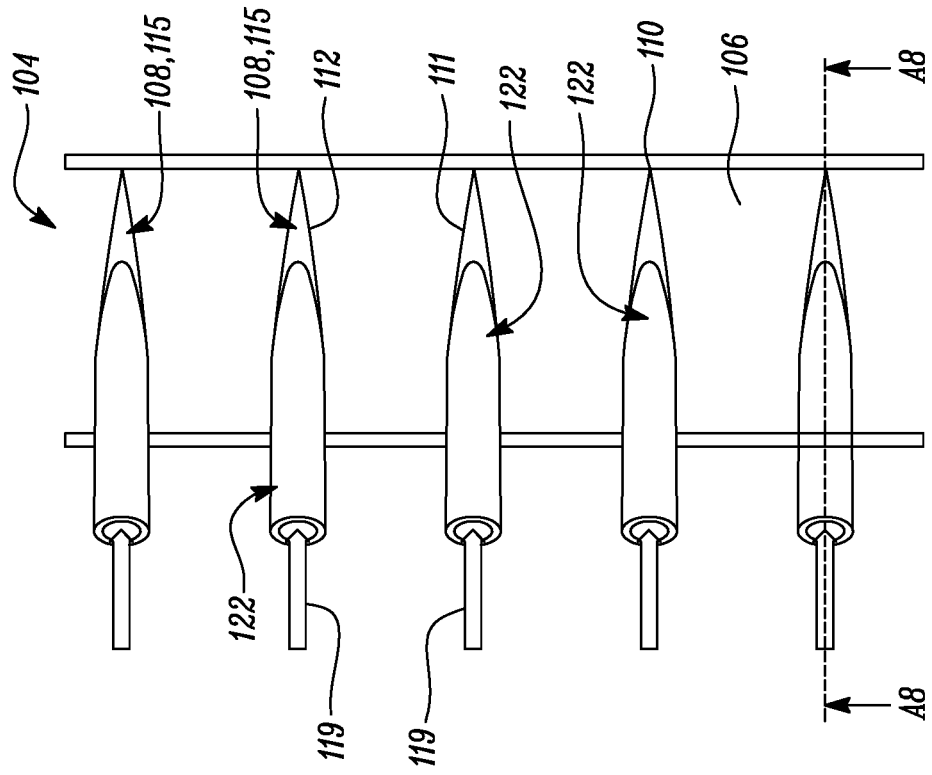
FIG. 7 a rolled out view of a portion of the tail bearing housing of FIG. 6.
Figure 8:
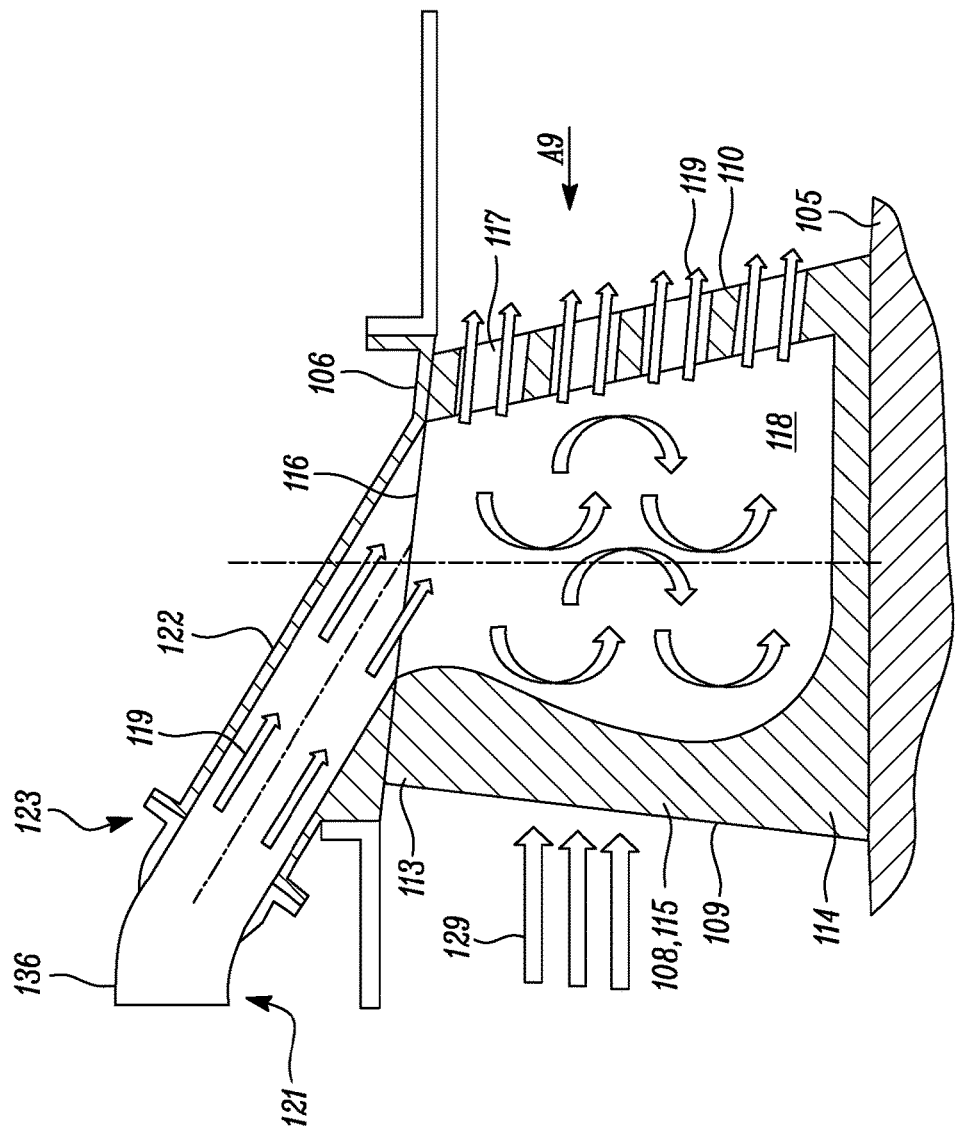
FIG. 8 is a sectional side view of a vent vane according to a first embodiment along line A8-A8 of FIG. 8.

FIG. 6 schematically shows a gas turbine engine 100, for example of the type illustrated in FIG. 1 and with some components omitted for sake of simplicity, comprising in axial flow series a compressor section 101, a core section 102, a turbine section 103 and a tail bearing housing 104. The compressor section 101 comprises a plurality of handling bleed valves 135 for bleeding air from the compressor 101 and increasing the surge margin and a duct system 121 connecting the handling bleed valves 135 and the tail bearing housing 104.

The tail bearing housing 104 comprises an inner casing 105 and an outer casing 106 concentrically arranged along a longitudinal axis 107, and a plurality of vanes 108 having a leading edge 109, a trailing edge 110, a first wall 111 extending from the leading edge 109 to the trailing edge 110, and a second wall 112 extending from the leading edge 109 to the trailing edge 110, the first wall 111 and the second wall 112 defining an aerofoil, the vanes 108 being connected at a first end 113 to the outer casing 106 and at a second end 114 to the inner casing 105. The vanes 108 may be welded to the inner casing 105 and outer casing 106. In alternative embodiments, the vanes may be cast, machined from solid or printed using Additive Layer Manufacturing (ALM).

At least one vane of said plurality of vanes 108 is a vent vane 115 comprising a first aperture 116 arranged in the first end 113 and a second aperture 117 arranged in the aerofoil. The second aperture 117 is in fluid communication with the first aperture 116 through an inner cavity 118 to vent bleed air 119.

At least one vane of the plurality of vanes 108 is a non-vent vane 120 provided with no second apertures 117.

Figure 13:
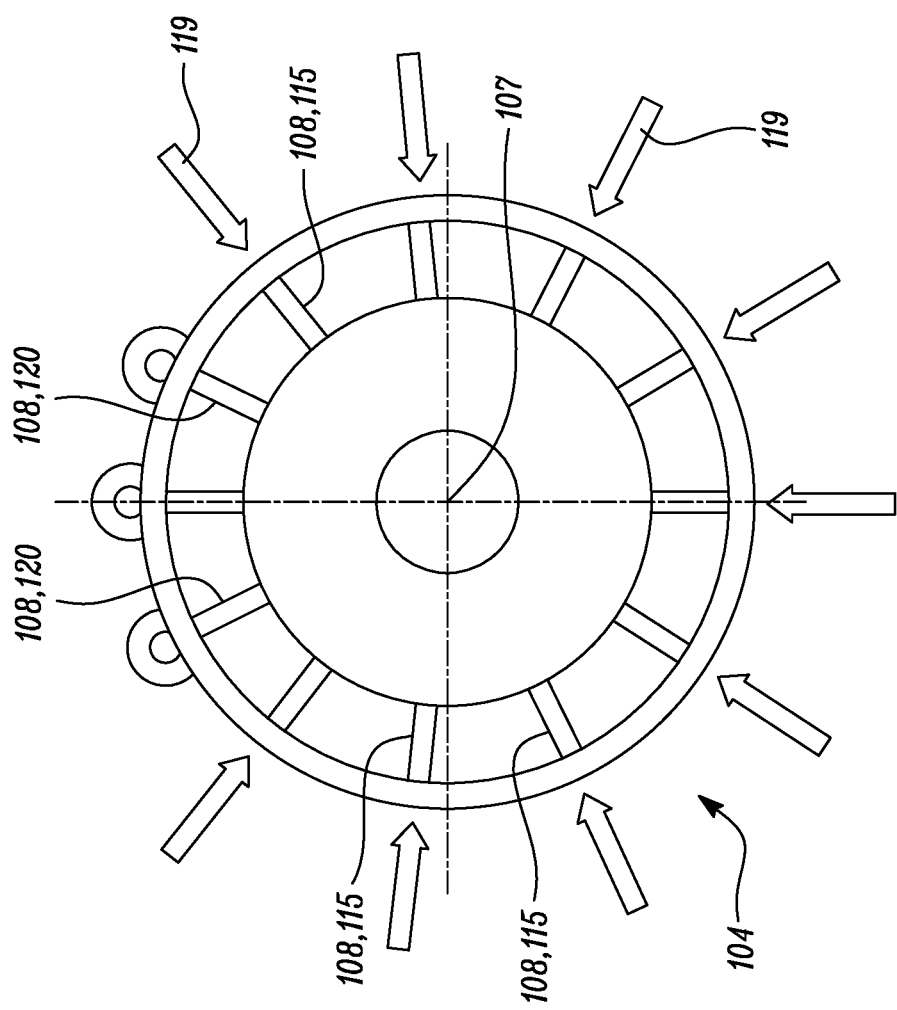
FIG. 13 is a rear view of a tail bearing housing according to an embodiment.

The tail bearing housing 104 may comprise a plurality of vent vanes 115 and non-vent vanes 120. The vent vanes 115 and non-vent vanes 120 may be radially arranged about the longitudinal axis 107 as illustrated in FIG. 13. Alternatively, the vent vanes 115 and non-vent vanes 120 may extend angled to a respective radial direction as illustrated in FIG. 14.

Figure 14:
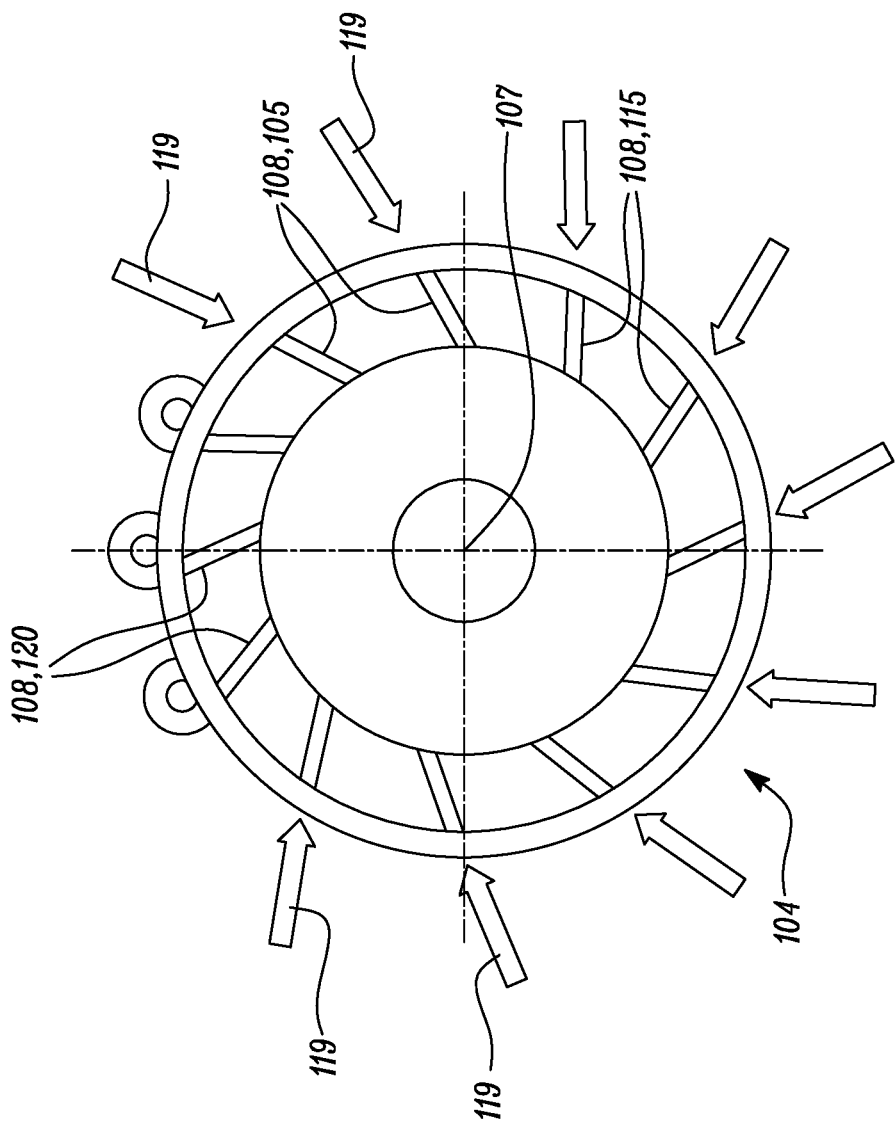
FIG. 14 is a rear view of a tail bearing housing according to another embodiment.

For sake of simplicity, it will appreciated that only a part of the vent vanes 115 and non-vent vanes 120 have been numbered in FIGS. 13 and 14. In substance, the vanes in correspondence of which an arrow (schematising bleed air 119 entering into the vane) is illustrated are vent vanes 115, the other vanes are non-vent vanes 120. In the illustrated embodiments, the tail bearing housing 104 comprises nine vent vanes 115 and three non-vent vanes 120, but the number of vent vanes and the number of non-vent vanes may vary, as well as the mutual arrangement about the longitudinal axis. In other not illustrated embodiment, the non-vented vanes may be omitted and replaced by vented vanes.

Core engine flow 129 from the turbine section 103 flows through the tail bearing housing 104 between the vanes 108 to remove residual swirl.

The outer casing 106 is provided with a conduit 122 connected at one end to the first aperture 116 and at an opposing end to the duct system 121, for example by means of a flanged coupling 123.

In substance, the handling bleed valves 135 are in fluid communication with the second apertures 117 through the duct system 121, the conduit 122, the first aperture 116 and the inner cavity 118, such that bleed air 119 from the compressor section 101 can be vented through the second apertures 117.

The duct system 121 comprises manifolds 127 and ducts 136 connecting one handling bleed valve 135 to a plurality of vent vanes 115. In FIG. 6, each manifold 127 connects one handling bleed valve 135 to three vent vanes 115 through respective conduits 122.

In not illustrated embodiments, each manifold 127 may connect one handling bleed valve 135 to two or more than three vent vanes 115. Alternatively, each manifold 127 may connect more than one handling bleed valve 135 to one, two or more than two vent vanes 115. In other not illustrated embodiments, the manifolds 127 may be dispensed with and the duct system 121 may comprise one or more ducts 136, each of which connecting one handling bleed valve 135 to one vent vane 115.

Figure 9A:
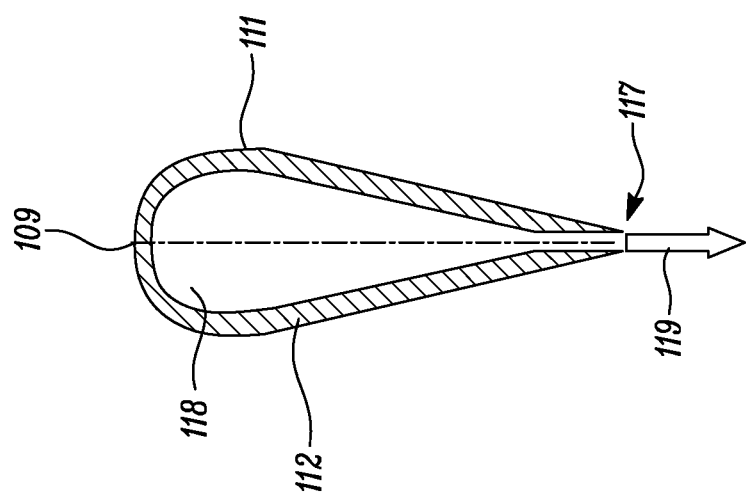
FIG. 9a is a sectional view of the vent vane of FIG. 9 along line C-C of FIG. 9.
Figure 9:
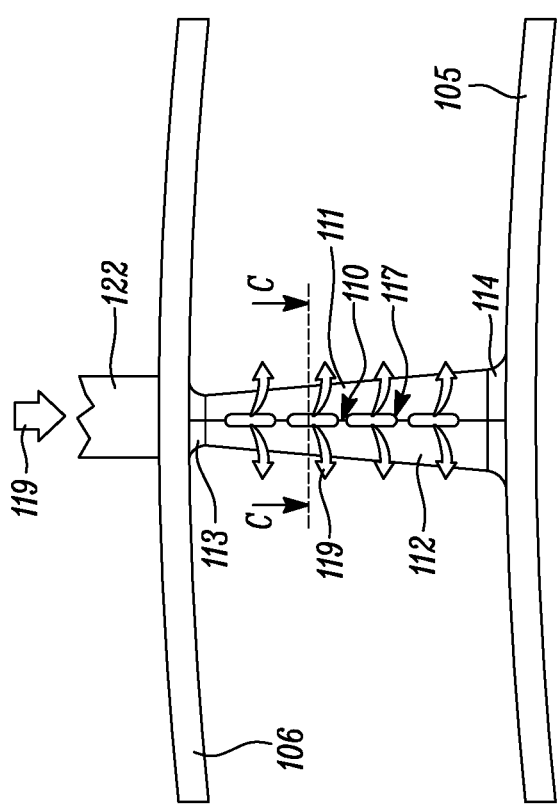
FIG. 9 is a front view of the vent vane of FIG. 8 along arrow A9 of FIG. 8.

FIGS. 8-12a illustrate different embodiment of the vent vane 115. Similar reference numerals are used to illustrate similar features. Mainly the differences between the embodiments will be described here In a first embodiment illustrated in FIGS. 8-9a, the vent vane 115 is provided with one first aperture 116 and a plurality of second apertures 117.

The second apertures 117 are in form of slots, arranged along the trailing edge 110 and extending spanwise. In other words, the second apertures 117 feature a slot-shaped transversal cross-section, extending in spawise direction.

The second apertures 117 are so shaped to vent bleed air 119 parallel to the core engine flow 129 downstream of the vanes 108. In the first embodiment of FIG. 8-9a, the second apertures 117 extend linearly and parallel to the core engine flow 129 at the trailing edge 110.

Figure 10A:
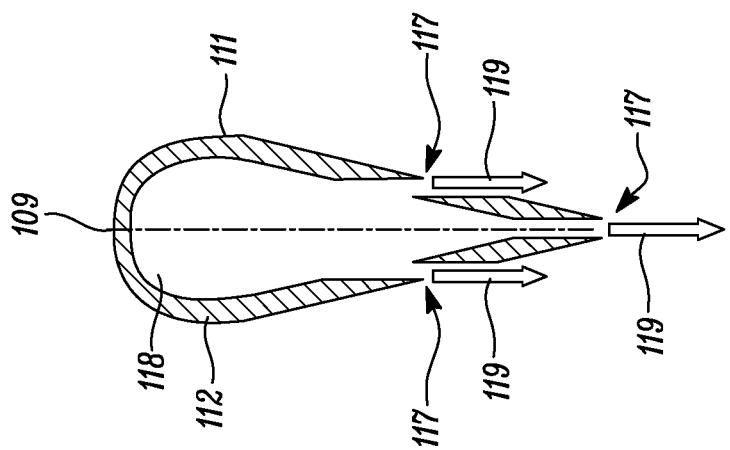
FIG. 10a a sectional view of the vent vane of FIG. 10 along line D-D of FIG. 10.
Figure 10:
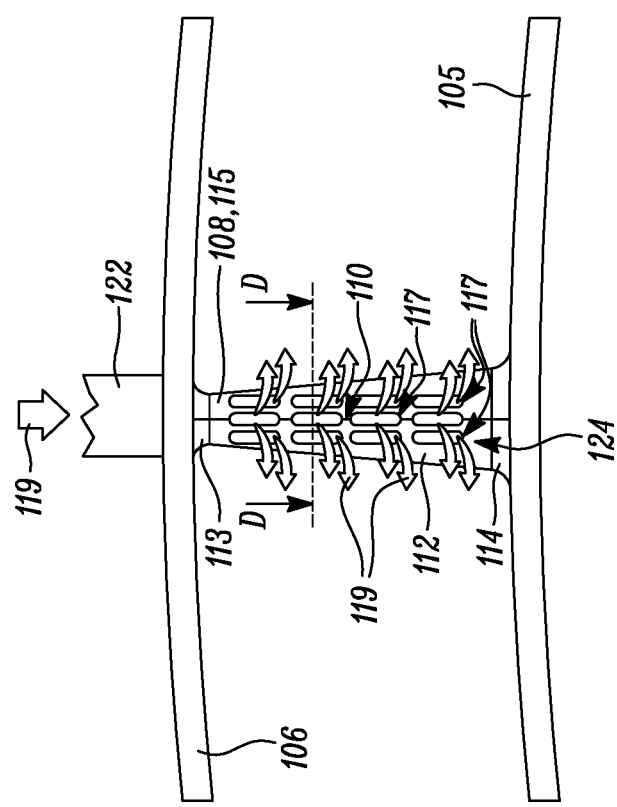
FIG. 10 is a front view of a vent vane according to a second embodiment.

FIGS. 10 and 10a show a second embodiment of vent vanes 115. The components of FIGS. 10 and 10a are substantially identical to the components of the first embodiment of FIGS. 8-9a, except as otherwise described below.

The vent vane 115 comprises a plurality of second apertures 117 in form of spanwise extending slots similarly to the first embodiment.

The second apertures 117 are arranged in groups 124 of second apertures 117 arranged at a same spanwise height. Each group 124 comprise one second aperture 117 arranged on the trailing edge 110, one second aperture 117 arranged on the first wall 111, and one third aperture 117 arranged on the second wall 112. In a not illustrated embodiment, each group 124 may comprise a different number of second apertures 117.

Figure 11A:
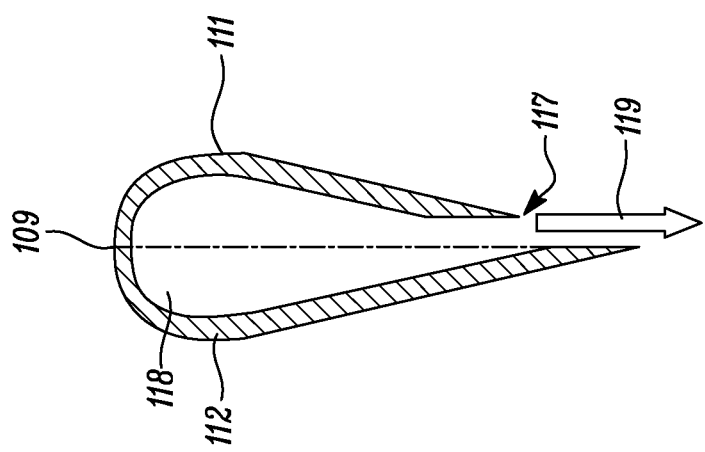
FIG. 11a a sectional view of the vent vane of FIG. 11 along line E-E of FIG. 11.
Figure 11:
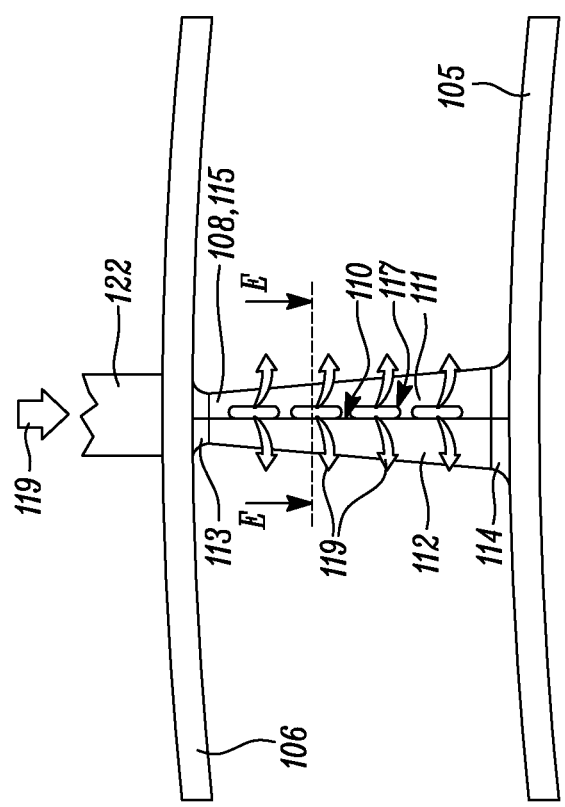
FIG. 11 is a front view of a vent vane according to a third embodiment.

FIGS. 11 and 11a show a third embodiment of vent vanes 115. The components of FIGS. 11 and 11a are substantially identical to the components of the first and second embodiments of FIGS. 8-9a and 10-10a, respectively, except as otherwise described below. The vent vane 115 comprises a plurality of second apertures 117 in form of spanwise extending slots similarly to the first and second embodiments. The second apertures 117 are arranged offset from the trailing edge 110. The apertures 117 are aligned parallel to the trailing edge 110 on the first wall 111. In not illustrated embodiments, the second apertures 117 may be provided on the second wall 112 only, or in both the first wall 111 and the second wall 112. For example, the second apertures 117 on the first wall 111 may be provided staggered with respect to the second apertures 117 on the second wall 112 along the spanwise direction.

Figure 12A:
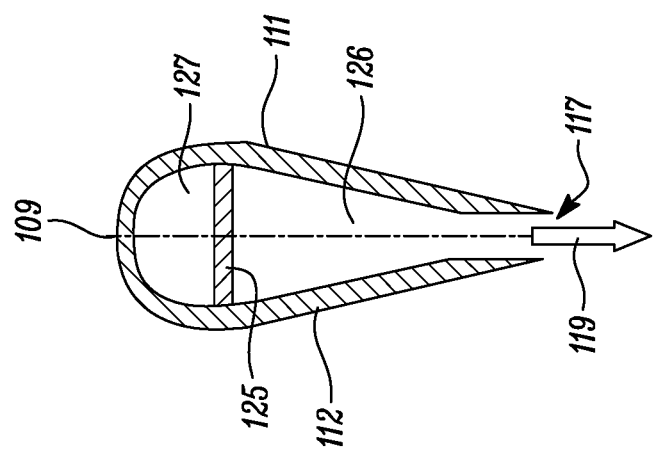
FIG. 12a a sectional view of the vent vane of FIG. 12 along arrow F-F of FIG. 12
Figure 12:
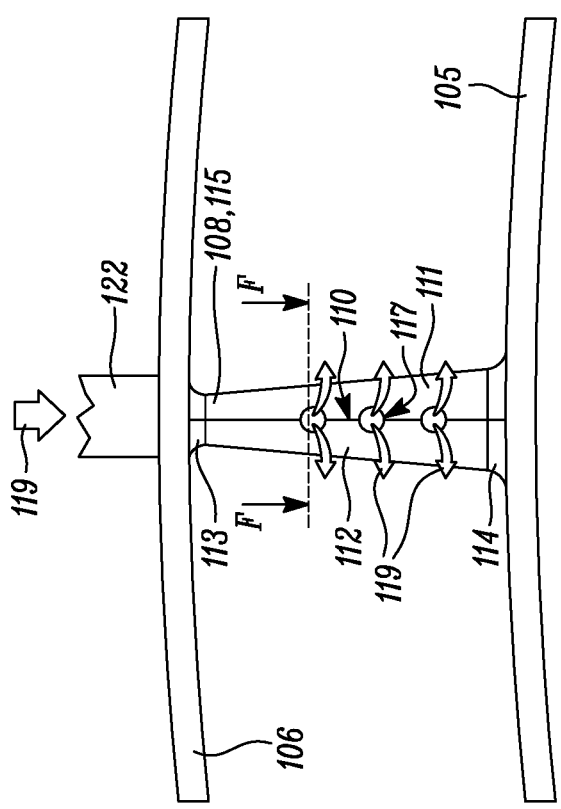
FIG. 12 is a front view of a vent vane according to a forth embodiment.

FIGS. 12 and 12a show a forth embodiment of vent vanes 115. The components of FIGS. 12 and 12a are substantially identical to the components of the first, second, and third embodiments of FIGS. 8-9a, 10-10a, and 11-11a, respectively, except as otherwise described below.

The vent vane 115 comprises a plurality of second apertures 117 in form of spanwise extending circular holes. In other words, the second apertures 117 feature a circular transversal cross-section. The second apertures are arranged aligned along the trailing edge 110.

The vent vane 115 comprises a septum 125 extending from the first wall 111 to the second wall 112, and from the first end 113 to the second end 114. The septum 125 divides the inner cavity into a first chamber 126 and a second chamber 127. As illustrated in FIG. 12a, the first chamber 126 is closer to the trailing edge 110 than the second chamber 127. The second apertures 117 are in fluid communication with the first aperture 116 through the first chamber 126. The second chamber 127 may house service pipes and cables, and sensors, for examples thermocouples.

Although illustrated in FIG. 12a only with reference to the forth embodiment, the vent vanes 115 of each of the first, second and third embodiment may comprise the septum 125 to define corresponding first and second chambers 126, 127.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A gas turbine engine, comprising:
   an engine core comprising a turbine, a compressor, and a shaft, the compressor comprising a handling bleed valve,
   a fan upstream of the engine core, the fan comprising a plurality of blades,
   a tail bearing housing comprising:
      an inner casing and an outer casing concentrically arranged along a longitudinal axis, wherein the outer casing is converging in an axial flow direction of the gas turbine engine, and
      a plurality of vanes having a leading edge, a trailing edge, a first wall extending from the leading edge to the trailing edge and a second wall extending from the leading edge to the trailing edge, the first wall and the second wall defining an aerofoil, the vanes being connected at a first end to the outer casing and at a second end to the inner casing,
      wherein at least one vane of said plurality of vanes is a vent vane comprising a first aperture arranged in the first end and a second aperture arranged in the aerofoil, the second aperture being in fluid communication with the first aperture through an inner cavity to vent compressor bleed air; and
   a duct system connecting the handling bleed valve with the vent vane of the tail bearing housing to extract from the compressor, and vent through the second apertures, the compressor bleed air.

2. The gas turbine engine according to claim 1, wherein the second aperture is arranged at, or adjacent, the trailing edge.

3. The gas turbine engine according to claim 1, wherein the second aperture is a slot or a circular hole.

4. The gas turbine engine according to claim 1, wherein the second aperture is shaped such that bleed air is vented parallel to the longitudinal axis.

5. The gas turbine engine according to claim 1, wherein the second aperture extends longitudinally parallel, or angled, to the longitudinal axis.

6. The gas turbine engine according to claim 1, wherein the vent vane comprises a plurality of second apertures.

7. The gas turbine engine according to claim 6, wherein the second apertures are arranged along the trailing edge.

8. The gas turbine engine according to claim 6, wherein the second apertures are arranged mutually aligned and/or offset from the trailing edge.

9. The gas turbine engine according to claim 6, wherein the second apertures are arranged in groups of at least two apertures, each group being arranged at different spanwise heights.

10. The gas turbine engine according to claim 1, wherein the vent vane comprises a septum extending from the first wall to the second wall transversally to the longitudinal axis and dividing the inner cavity into a first chamber and a second chamber, the first chamber being closer to the trailing edge than the second chamber, the first aperture being in fluid communication with the second aperture through the first chamber.

11. The gas turbine engine according to claim 1, wherein the outer casing comprises a conduit arranged in correspondence of the first aperture of the vent vane.

12. The gas turbine engine according to claim 1, comprising a plurality of vent vanes.

13. The gas turbine engine according to claim 1, wherein the tail bearing housing comprises a plurality of vent vanes, and wherein the duct system comprises a manifold configured to connect the handling bleed valve to said plurality of vent vanes.

14. The gas turbine engine according to claim 1, wherein the tail bearing housing comprises a plurality of vent vanes, wherein the compressor comprises a plurality of handling bleed valves and the duct system comprises a plurality of ducts, each duct connecting one handling bleed valve to one vent vane.

15. The gas turbine engine according to claim 1, wherein the tail bearing housing comprises a plurality of vent vanes, wherein the compressor comprises a plurality of handling bleed valves, and wherein the duct system comprises a plurality of manifolds, each manifold being configured to connect one handling bleed valve to a plurality of vent vanes.

16. The gas turbine engine according to claim 1, wherein the bleed air is vented parallel to the longitudinal axis.

17. The gas turbine engine according to claim 1, wherein the outer casing of the tail bearing housing comprises a conduit arranged in correspondence of the first aperture of the vent vane, the duct system being secured to the conduit by means of a flanged coupling.

18. A method for venting bleed air in a gas turbine engine comprising:
providing a gas turbine engine comprising an engine core with a turbine, a shaft, and a compressor provided with a handling bleed valve, a fan upstream of the engine core, the fan comprising a plurality of blades, and a tail bearing housing provided with an inner casing, an outer casing that is converging in an axial flow direction of the gas turbine engine and a plurality of vanes connected at a first end to the outer casing and at a second end to the inner casing, the vanes having a leading edge, a trailing edge, a first wall extending from the leading edge to the trailing edge and a second wall extending from the leading edge to the trailing edge, the first wall and the second wall defining an aerofoil, at least one vane of said plurality of vanes being a vent vane comprising a first aperture arranged in the first end and a second aperture arranged in the aerofoil, the second aperture being configured to be in fluid communication with the first aperture through an inner cavity to vent bleed air;
extracting bleed air from the compressor through the handling bleed valve;
directing the bleed air to the at least one vent vane through a duct system connecting the handling bleed valve with the first aperture, and
venting the bleed air from the at least one vent vane through the second aperture.

19. The method according to claim 18, wherein the inner casing and the outer casing are provide concentrically arranged along a longitudinal axis, and wherein venting the bleed air from the at least one vent vane through the second aperture includes venting the bleed air parallel to a core engine flow at the trailing edge of the vent vane.

* * * * *